(12) United States Patent
Yang et al.

(10) Patent No.: US 10,171,428 B2
(45) Date of Patent: Jan. 1, 2019

(54) CONFIDENTIAL DATA MANAGEMENT METHOD AND DEVICE, AND SECURITY AUTHENTICATION METHOD AND SYSTEM

(71) Applicant: Rowem Inc., Seoul (KR)

(72) Inventors: Giho Yang, Seoul (KR); Jae Yeob Hwang, Gyeonggi-do (KR)

(73) Assignee: Rowem Inc., Seoul (KR)

( * ) Notice: Subject to any disclaimer, the term of this patent is extended or adjusted under 35 U.S.C. 154(b) by 171 days.

(21) Appl. No.: 15/125,866

(22) PCT Filed: Mar. 13, 2015

(86) PCT No.: PCT/KR2015/002441
§ 371 (c)(1),
(2) Date: Sep. 13, 2016

(87) PCT Pub. No.: WO2015/137760
PCT Pub. Date: Sep. 17, 2015

(65) Prior Publication Data
US 2017/0005995 A1    Jan. 5, 2017

(30) Foreign Application Priority Data

| Mar. 14, 2014 | (KR) | 10-2014-0030395 |
| Apr. 3, 2014 | (KR) | 10-2014-0040224 |
| Mar. 13, 2015 | (KR) | 10-2015-0034723 |

(51) Int. Cl.
*H04L 29/06* (2006.01)
*G06F 21/62* (2013.01)
(Continued)

(52) U.S. Cl.
CPC ...... *H04L 63/0428* (2013.01); *G06F 21/6245* (2013.01); *H04L 9/0861* (2013.01);
(Continued)

(58) Field of Classification Search
CPC ... H04L 63/0428; H04L 9/0861; H04L 63/06; H04L 63/062; H04L 63/0853; H04L 63/18; G06F 21/6245
See application file for complete search history.

(56) References Cited

U.S. PATENT DOCUMENTS

| 6,347,145 | B2 | 2/2002 | Kato et al. |
| 2004/0205340 | A1 | 10/2004 | Shimbo et al. |

(Continued)

FOREIGN PATENT DOCUMENTS

| KR | 2002-0025343 A | 4/2002 |
| KR | 2003-0012556 A | 2/2003 |

(Continued)

OTHER PUBLICATIONS

Jun. 17, 2015 International Search Report for PCT/KR2015/002441.

*Primary Examiner* — Oleg Korsak
(74) *Attorney, Agent, or Firm* — Hahn Loeser & Parks, LLP

(57) ABSTRACT

The present invention relates to a method for safely managing confidential data and a security authentication method and system for performing a security authentication by using the confidential data. The method for managing confidential data of a user by linking with a security server which stores a decryption key in a confidential data management device, according to the present invention, comprises the steps of: storing encrypted confidential data of a user; receiving a push notification message including a decryption key from the security server, if a use of the confidential data is required; and decrypting the encrypted confidential data by using the decryption key included in the push notification message.

15 Claims, 12 Drawing Sheets

(51) Int. Cl.
*H04L 9/08* (2006.01)
*H04L 29/08* (2006.01)
*G06F 21/36* (2013.01)

(52) U.S. Cl.
CPC ............ *H04L 63/06* (2013.01); *H04L 63/062* (2013.01); *H04L 63/0853* (2013.01); *H04L 63/18* (2013.01); *G06F 21/36* (2013.01); *H04L 63/083* (2013.01); *H04L 67/26* (2013.01)

(56) References Cited

U.S. PATENT DOCUMENTS

| | | |
|---|---|---|
| 2007/0058815 A1 | 3/2007 | Kwak et al. |
| 2007/0297610 A1 | 12/2007 | Chen et al. |
| 2008/0072042 A1 | 3/2008 | Okuyama et al. |
| 2008/0112563 A1 | 5/2008 | Choi |
| 2008/0184363 A1 | 7/2008 | Narasimhan |
| 2011/0142227 A1 | 6/2011 | Lee et al. |
| 2013/0185779 A1 | 7/2013 | Tamai et al. |

FOREIGN PATENT DOCUMENTS

| | | |
|---|---|---|
| KR | 2007-0061222 A | 6/2007 |
| KR | 10-1172876 B | 8/2012 |

FIG. 7

| 1 | 2 | 3 |
|---|---|---|
| 4 | 5 | 6 |
| 7 | 8 | 9 |
| * | 0 | # |

(a)

| s~b | fF* | t#A |
|---|---|---|
| y.p | M77 | $lz |
| R,! | sdG | u5E |
| Cxi | K&g | jD0 |

(b)

| 42A | AA9 | 08? |
|---|---|---|
| 9zz | Azb | C09 |
| j8i | i.9 | u8c |
| G08 | 1*2 | 58a |

(c)

CONFIDENTIAL DATA MANAGEMENT METHOD AND DEVICE, AND SECURITY AUTHENTICATION METHOD AND SYSTEM

TECHNICAL FIELD

The present disclosure relates to confidential data management technology and authentication technology, and more particularly, to a method for managing confidential data safely and a secure authentication method and system for performing secure authentication using the confidential data.

The present application is a 35 U.S.C. § 371(c) submission international application no. PCT/KR2015/002441, filed on 13 Mar. 2015 and published on 17 Sep. 2015 with publication no. WO 2015/137760 A1, which claims priority to Korean Patent Application No. 10-2014-0030395 filed in the Republic of Korea on Mar. 14, 2014, Korean Patent Application No. 10-2014-0040224 filed in the Republic of Korea on Apr. 3, 2014, and Korean Patent Application No. 10-2015-0034723 filed in the Republic of Korea on Mar. 13, 2015, the disclosure of which is incorporated herein by reference.

BACKGROUND ART

To store confidential data safely, users input an encryption key, encrypt the confidential data, and stores it in a computer. Also, the users input a decryption key, decrypt the encrypted confidential data, and access the confidential data.

However, a conventional data decrypting method requests a decryption key of encrypted data to a user each time the user accesses the encrypted data, causing inconvenience to the user.

DISCLOSURE

Technical Problem

The present disclosure is designed to solve the conventional problem, and therefore, the present disclosure is directed to providing a confidential data management method and device with enhanced security of confidential data and improved user convenience.

Furthermore, the present disclosure is directed to providing a secure authentication method and system for protecting authentication information of a user safely from external hacking and performing enhanced authentication.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the above objects, a confidential data management method according to a first aspect of the present disclosure, by which a confidential data management device manages confidential data of a user in interoperation with a security server that stores a decryption key, the confidential data management method including storing encrypted confidential data of the user, receiving a push notification message including the decryption key from the security server when it is necessary to use the confidential data, and decrypting the encrypted confidential data using the decryption key included in the push notification message.

To achieve the above objects, a confidential data management method according to a second aspect of the present disclosure, by which a confidential data management device manages confidential data of a user in interoperation with a security server that stores encrypted confidential data of the user, the confidential data management method including storing a decryption key for confidential data, receiving a push notification message including the encrypted confidential data from the security server when it is necessary to use the confidential data, and decrypting the encrypted confidential data included in the push notification message using the stored decryption key.

To achieve the above objects, a confidential data management device according to a third aspect of the present disclosure includes at least one processor, a memory, and at least one program stored in the memory and configured to be executed by the at least one processor, wherein the program includes a storage module which stores encrypted confidential data, a server interoperation module which receives a push notification message including a decryption key from a security server that stores the decryption key when it is necessary to use the confidential data, and a decrypting module which decrypts the encrypted confidential data stored in the storage module using the decryption key included in the push notification message.

To achieve the above objects, a secure authentication method for performing secure authentication of a user by an authentication system according to a fourth aspect of the present disclosure includes receiving, by a service server, a service request from a first communication terminal, transmitting, by a security server, a notification message including a stored decryption key to a second communication terminal in response to a notification message transmission request received from the service server, decrypting, by the second communication terminal, a stored encrypted code table using the decryption key received from the security server, outputting, by the second communication terminal, a security keypad to a screen, and when at least one input value is received through the security keypad, identifying each code mapped to the received at least one input value in the decrypted code table, generating, by the second communication terminal, authentication information consisting of a combination of each identified code, and transmitting the authentication information to the service server, and authenticating, by the service server, the first communication terminal based on the authentication information received from the second communication terminal.

To achieve the above objects, a secure authentication system according to a fifth aspect of the present disclosure includes a service server which receives a request for a service from a first communication terminal, a security serve which stores a decryption key of a code table, and transmits a notification message including the stored decryption key to a second communication terminal in response to a notification message transmission request received from the service server, and a second communication terminal which stores an encrypted code table, decrypts the encrypted code table using a decryption key received from the security server, identifies each code mapped to at least one input value received through a security keypad in the decrypted code table, generates authentication information consisting of a combination of each identified code, and transmits it to the service server, wherein the service server authenticates the first communication terminal based on the authentication information received from the second communication terminal.

To achieve the above objects, a secure authentication method for performing secure authentication of a user by an authentication system according to a sixth aspect of the present disclosure includes receiving, by a service server, a service request from a first communication terminal, transmitting, by a security server, a notification message including a stored decryption key to a second communication terminal in response to a notification message transmission request received from the service server, decrypting, by the second communication terminal, stored encrypted code table identification information using the decryption key, outputting, by the second communication terminal, a security keypad to a screen, receiving at least one input value from a user through the security keypad, and transmitting the plurality of input values and the decrypted code table identification information to an authentication information generation server, selecting, by the authentication information generation server, a code table having the code table identification information, and identifying codes mapped to the plurality of input values in the selected code table, generating, by the authentication information generation server, authentication information consisting of a combination of each identified code, and receiving, by the service server, the generated authentication information, and authenticating the first communication terminal based on the authentication information.

Advantageous Effects

The present disclosure does not request a decryption key to a user when the user accesses confidential data, and receives a push notification message from a server and decrypts the encrypted confidential data based on a decryption key included in the push notification message, thereby enhancing the convenience of the user.

Also, the present disclosure stores the decryption key and the encrypted confidential data in each of a plurality of devices that is mechanically separated from one another, and allows the encrypted confidential data to be decrypted through interoperation of the two devices, thereby improving the security of confidential data of the user.

On the other hand, the secure authentication system according to the present disclosure generates authentication information having a complex character string mapped to input values of a security keypad, and authenticates the user based on the authentication information, thereby enhancing the security of authentication information.

Also, the secure authentication system according to the present disclosure generates different authentication information based on an endpoint even though the user selects a same key button, thereby providing convenience to the user as well as protecting authentication information of the user more safely from external hacking such as a peeping attack.

Further, the secure authentication system according to the present disclosure prevents confidential data from being normally identified using data stored in only any one of a particular device and a server, thereby protecting the user data reliably from external hacking.

BRIEF DESCRIPTION OF THE DRAWINGS

The accompanying drawings illustrate preferred embodiments of the present disclosure, and together with the detailed description for carrying out the invention, serve to provide further understanding of the technical spirit of the present disclosure. However, the present disclosure should not be construed as being limited to the drawings.

FIG. 7 is a diagram showing a security keypad and a code table according to an embodiment of the present disclosure.

MODE FOR CARRYING OUT THE INVENTION

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily make the essence of the disclosure vague, its detailed description is omitted herein. Hereinafter, a preferred embodiment of the present disclosure is described in detail with reference to the accompanying drawings.

Unless otherwise defined, it should be understood that the use of the terms "comprises" and/or "comprising", or "includes" and/or "including" when used in this specification, specify the presence of stated elements, but do not preclude the presence or addition of one or more other elements. Also, the term " . . . unit" or "module" as used herein is intended to refer to a processing unit of at least one function or operation, either hardware, a combination of hardware and software, or software.

Figure 1:
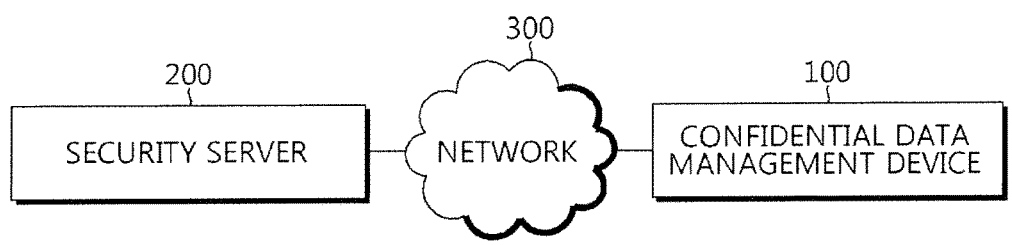
FIG. 1 is a diagram showing an architecture of a confidential data management system according to an embodiment of the present disclosure.

FIG. 1 is a diagram showing an architecture of a confidential data management system according to an embodiment of the present disclosure.

As shown in FIG. 1, the confidential data management system according to an embodiment of the present disclosure includes a security server 200 and a confidential data management device 100. The security server 200 and the confidential data management device 100 communicate with one another via a network 300. The network 300 includes a mobile communication network, a short-range wireless communication network and a wired Internet network, and because it corresponds known technology in the present disclosure, its detailed description is omitted herein.

The security server 200 maps a decryption key of a user to identification information of the confidential data management device 100 and stores it. Also, when the security server 200 receives a request for the decryption key from the confidential data management device 100, the security server 200 extracts the decryption key mapped to the identification information of the confidential data management device 100 and transmits a push notification message including the decryption key to the confidential data management device 100. That is, the security server 200 includes the decryption key in a push-type notification message, and transmits it to the confidential data management device 100.

When the security server 200 receives a request for storage of the decryption key from the user, the security server 200 identifies the identification information of the confidential data management device 100 designated by the user, and maps the identification information to the decryption key received from the user and stores it. Also, when the security server 200 receives a request for discarding of the decryption key from the user, the security server 200 discards the decryption key registered by the user after performing user authentication.

As another embodiment, the security server 200 may map encrypted confidential data to identification information of the confidential data management device 100 and store it. In this case, when the security server 200 receives a request for the confidential data from the confidential data management device 100, the security server 200 extracts the encrypted confidential data mapped to the identification information of the confidential data management device 100, and transmits a push notification message including the encrypted confidential data to the confidential data management device 100. That is, the security server 200 includes the encrypted confidential data in a push-type notification message, and transmits it to the confidential data management device 100.

The identification information of the confidential data management device 100 may be security application identification information, subscriber identity module (SIM) identification information of the confidential data management device 100, a manufacturer serial number of the confidential data management device 100 or a telephone number. Also, the confidential data includes a password, an authentication certificate, a file, and a photo.

The confidential data management device 100 performs a function of controlling the access to confidential data in interoperation with the security server 200. The confidential data management device 100 stores encrypted confidential data, and when the user accesses the confidential data, requests a decryption key for normally decrypting the encrypted confidential data to the security server 200. When the confidential data management device 100 receives the decryption key from the security server 200, the confidential data management device 100 decrypts the encrypted confidential data using the decryption key. As another embodiment, the confidential data management device 100 stores a decryption key, and when the user tries to access the confidential data, requests the encrypted confidential data to the security server 200 and decrypts the encrypted confidential data received from the security server 200 using the stored decryption key.

Figure 2:
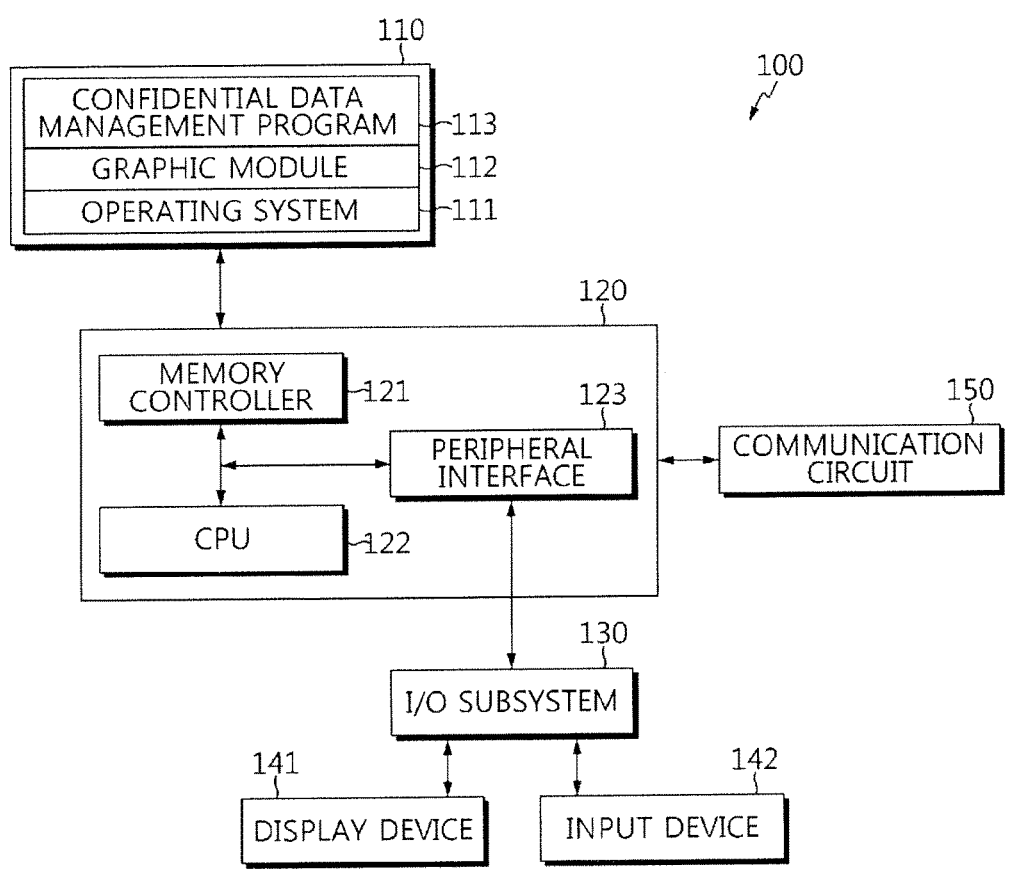
FIG. 2 is a diagram showing a configuration of a confidential data management device according to an embodiment of the present disclosure.

FIG. 2 is a diagram showing the configuration of the confidential data management device according to an embodiment of the present disclosure.

As shown in FIG. 2, the confidential data management device 100 according to an embodiment of the present disclosure includes a memory 110, a memory controller 121, at least one processor (CPU) 122, a peripheral interface 123, an input/output (I/O) subsystem 130, a display device 141, an input device 142, and a communication circuit 150. These components communicate through at least one communication bus or signal line. Many components shown in FIG. 2 include at least one signal processing and/or application specific integrated circuit, and can be embodied as hardware, software, or a combination of hardware and software.

The memory 110 may include a rapid random access memory, and may include at least one magnetic disk storage device, a non-volatile memory such as a flash memory device, or other non-volatile semiconductor memory device. In some embodiments, the memory 110 may further include a storage device far away from the at least one processor 122, for example, a network attached storage device that is accessed through a communication circuit 150 and a communication network such as Internet, Intranet, Local Area Network (LAN), Wide LAN (WLAN), Storage Area Network (SAN), or combinations thereof. Access to the memory 110 by other component of the confidential data management device 100 such as the processor 122 and the peripheral interface 123 may be controlled by the memory controller 121.

The peripheral interface 123 connects an I/O peripheral device to the processor 122 and the memory 110. The at least one processor 122 performs many functions for the confidential data management device 100 and data processing by executing various software programs and/or an instruction set stored in the memory 110.

In some embodiments, the peripheral interface 123, the processor 122 and the memory controller 121 may be embodied on a single chip such as a chip 120. In other embodiments, these may be embodied as separate chips.

The I/O subsystem 130 provides interfacing between an I/O peripheral device of the confidential data management device 100 such as the display device 141 and the input device 142, and the peripheral interface 123.

The display device 141 may use liquid crystal display (LCD) technology, light emitting polymer display (LPD) technology or light emitting diode (LED) technology, and the display device 141 may be a capacitive, resistive, or infrared touch display. The touch display provides output interfacing and input interfacing between the device and the user. The touch display displays a visual output to the user. The visual output may include a text, graphics, a video, and combinations thereof. The visual output may correspond to a user interface object, in part or in whole. The touch display forms a touch sensing surface for receiving a user input.

The input device 142 is an input means such as a keypad and a keyboard, and receives an input signal from the user.

The processor 122 is a processor configured to perform an operation associated with the confidential data management device 100 and execute instructions, and for example, the processor 122 can control the receipt and manipulation of input and output data between the components of the confidential data management device 100 using instructions retrieved from the memory 110.

The communication circuit 150 transmits and receives a radio electromagnetic wave through an antenna, or transmits and receives data through a wired cable. The communication circuit 150 converts an electrical signal to an electromagnetic wave, vice versa, and through this electromagnetic wave, can communicate with a communication network, a mobile gateway device, and a communication device. The communication circuit 150 may include a known circuit for performing a function, including, but not limited to, for example, an antenna system, a RF transceiver, at least one amplifier, a tuner, at least one oscillator, a digital signal processor, a CODEC chipset, a subscriber identity module (SIM) card, and a memory. The communication circuit 150 may communicate with other device via a wireless network such as Internet called World Wide Web (WWW), Intranet and a network and/or a mobile communication network, a wireless LAN and/or a metropolitan area network (MAN), or a wired network.

Software components, an operating system 111, a graphic module (an instruction set) 112 and a confidential data management program (an instruction set) 113, are mounted (installed) in the memory 110.

The operating system 111 may be an embedded operating system such as, for example, Darwin, RTXC, LINUX, UNIX, OS X, WINDOWS, VxWorks, Tizen, IOS or android, and may include various software components and/or devices that control and manage general system tasks (for example, memory management, storage device control, power management, etc.).

The graphic module 112 includes many known software components for providing and displaying graphics on the display device 141. The term "graphic" used herein includes a text, a web page, a key button, a digital image, a video, and an animation without limitation, and includes any object that can be displayed to the user.

The confidential data management program 113 performs a function of storing and managing the encrypted confidential data of the user. When the user accesses the encrypted confidential data, the confidential data management program 113 receives, from the security server 200, a push notification message including a decryption key for normally decrypting the confidential data and decrypts the encrypted confidential data using the decryption key.

Also, in other embodiments, the confidential data management program 113 may store the decryption key of the user instead of the encrypted confidential data. In this case, when the user accesses the confidential data, the confidential data management program 113 receives a push notification message including the encrypted confidential data from the security server 200 and decrypts the encrypted confidential data using the stored decryption key.

The confidential data management program 113 may be mounted in the memory 110 in case that a confidential data management application is installed.

Figure 3:
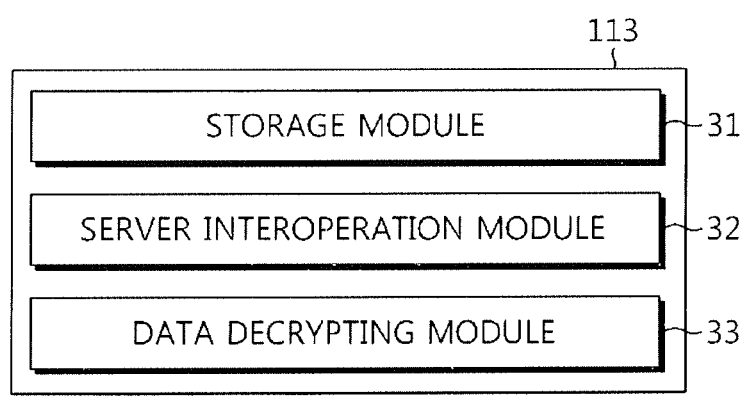
FIG. 3 is a diagram showing a configuration of a confidential data management program according to an embodiment of the present disclosure.

FIG. 3 is a diagram showing the configuration of the confidential data management program according to an embodiment of the present disclosure.

As shown in FIG. 3, the confidential data management program 113 according to an embodiment of the present disclosure includes a storage module 31, a server interoperation module 32 and a data decrypting module 33.

The storage module 31 stores encrypted confidential data of the user. A password, an authentication certificate, a file, and a photo as the confidential data may be encrypted and stored in the storage module 31. As another embodiment, the storage module 31 may store a decryption key.

When it is necessary to use the confidential data, the server interoperation module 32 transmits a decryption key request message including identification information of the confidential data management device 100 to the security server 200, and receives a push notification message including the decryption key from the security server 200. In other embodiments, when it is necessary use the confidential data, the server interoperation module 32 may transmit a confidential data request message including identification information of the confidential data management device 100 to the security server 200, and receive a push notification message including the encrypted confidential data of the user from the security server 200.

The data decrypting module 33 decrypts the confidential data stored in the storage module 31 using the decryption key included in the push notification message. In other embodiments, the data decrypting module 33 may decrypt the encrypted confidential data included in the push notification message using the decryption key stored in the storage module 31.

Figure 4:
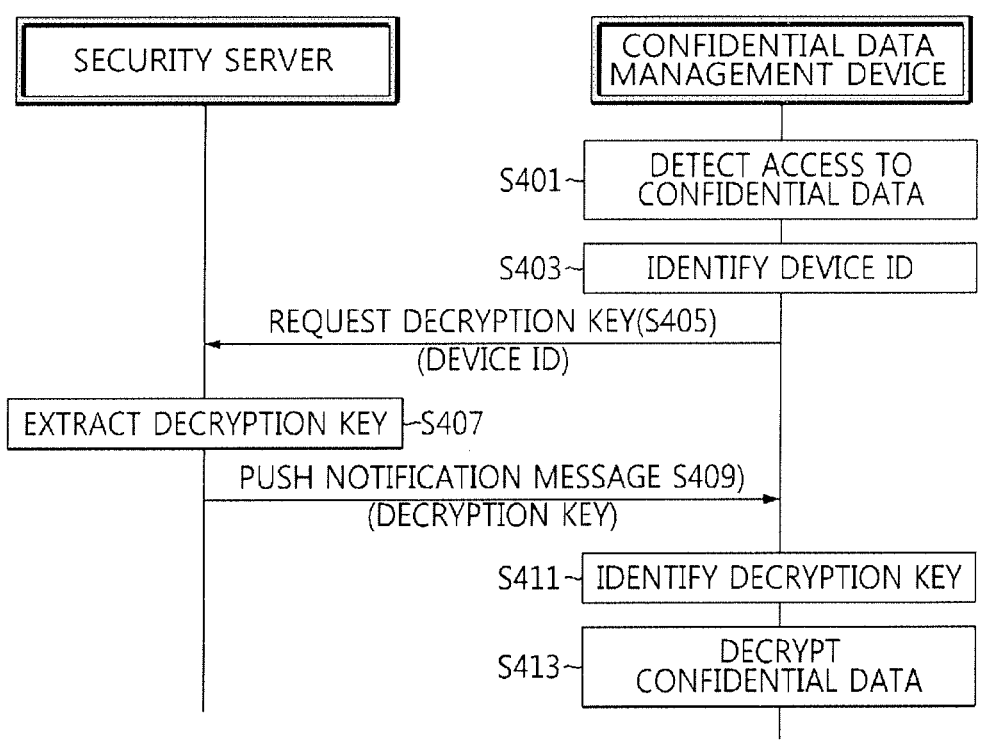
FIG. 4 is a flowchart showing a method for managing confidential data in interoperation with a security server by a confidential data management device according to an embodiment of the present disclosure.

FIG. 4 is a flowchart showing a method for managing confidential data in interoperation with the security server by the confidential data management device according to an embodiment of the present disclosure.

In the embodiment with reference to FIG. 4, encrypted confidential data is stored in the storage module 31, and a decryption key is stored in the security server 200.

Referring to FIG. 4, when the server interoperation module 32 detects a user's access to confidential data (S401), the server interoperation module 32 determines that it is necessary to use the confidential data, and identifies identification information of the confidential data management device 100 (e.g., confidential data management application ID, SIM identification information or a manufacturer serial number of a confidential data management device or a telephone number) (S403). In this instance, in case that the user accesses the confidential data stored in the storage module 31, the server interoperation module 32 may determine that it is necessary to use the confidential data.

Subsequently, the server interoperation module 32 transmits a decryption key request message including the identification information of the confidential data management device 100 to the security server 200 using the communication circuit 150 (S405).

Then, the security server 200 identifies the identification information of the confidential data management device 100 included in the decryption key request message, and extracts a decryption key mapped to the identification information (S407). That is, the security server 200 extracts a decryption key pre-registered by the user based on the identification information of the confidential data management device 100. Subsequently, the security server 200 transmits a push notification message including the extracted decryption key to the confidential data management device 100 (S409).

Subsequently, the server interoperation module 32 receives the push notification message through the communication circuit 150 and delivers it to the data decrypting module 33, and the data decrypting module 33 identifies the decryption key included in the push notification message (S411). Subsequently, the data decrypting module 33 extracts the encrypted confidential data from the storage module 31. Also, the data decrypting module 33 decrypts the extracted encrypted confidential data using the identified decryption key in the push notification message (S413), so that the user is permitted to normally use the confidential data.

Figure 5:
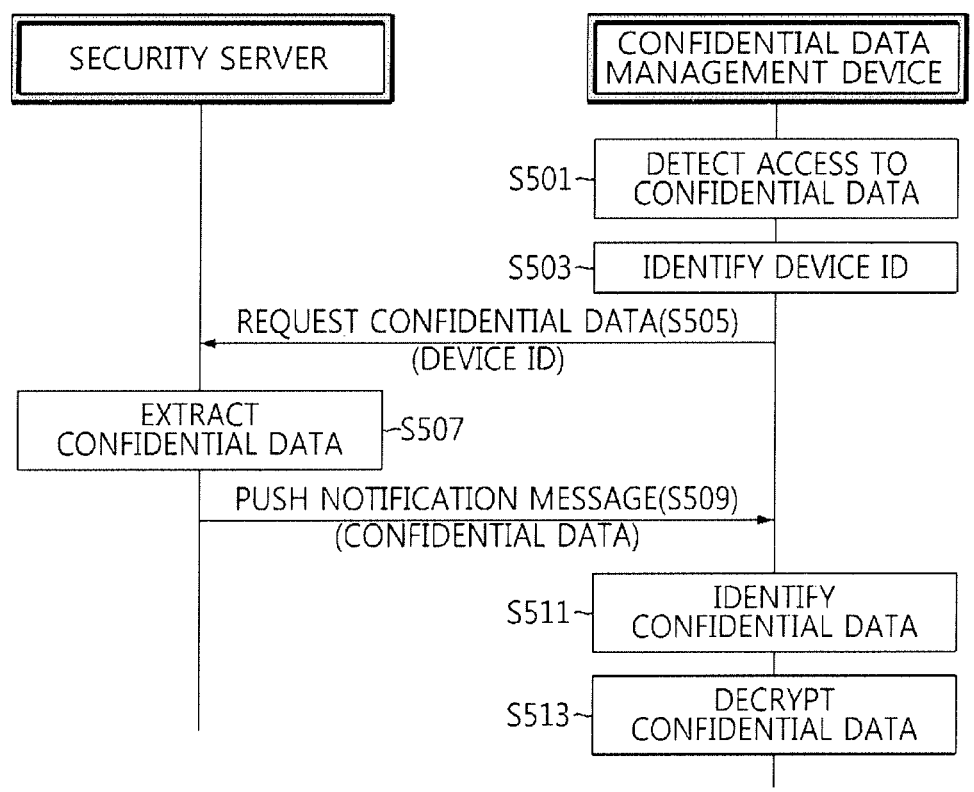
FIG. 5 is a flowchart showing a method for managing confidential data in interoperation with a security server by a confidential data management device according to another embodiment of the present disclosure.

FIG. 5 is a flowchart showing a method for managing confidential data in interoperation with the security server by the confidential data management device according to another embodiment of the present disclosure.

In another embodiment with reference to FIG. 5, a decryption key is stored in the storage module 31, and encrypted confidential data is stored in the security server 200.

Referring to FIG. 5, when the server interoperation module 32 detects a user's access to confidential data (S501), the server interoperation module 32 determines that it is necessary to us the confidential data, and identifies identification information of the confidential data management device 100 (S503). Preferably, the storage module 31 stores a dummy file associated with confidential data, and in case that the user accesses the dummy file stored in the storage module 31, the server interoperation module 32 may determine that it is necessary to use the confidential data.

Subsequently, the server interoperation module 32 transmits a confidential data request message including the identification information of the confidential data management device 100 to the security server 200 using the communication circuit 150 (S505).

Then, the security server 200 identifies the identification information of the confidential data management device 100 included in the confidential data request message, and extracts encrypted confidential data mapped to the identification information (S507). That is, the security server 200 extracts encrypted confidential data pre-registered by the user based on the identification information of the confidential data management device 100. Subsequently, the security server 200 transmits a push notification message including the extracted confidential data to the confidential data management device 100 (S509).

Subsequently, the server interoperation module 32 receives the push notification message through the communication circuit 150 and delivers it to the data decrypting module 33, and the data decrypting module 33 identifies the encrypted confidential data included in the push notification message (S511). Subsequently, the data decrypting module 33 extracts a decryption key from the storage module 31. Also, the data decrypting module 33 decrypts the encrypted confidential data using the extracted decryption key, so that the user is permitted to normally use the confidential data (S513).

As described above, when a user accesses confidential data, the confidential data management device 100 according to the present disclosure does not request a decryption key to the user, and receives a push notification message from a server, decrypts encrypted confidential data based on a decryption key included in the push notification message, thereby providing enhanced convenience to the user. Also, the present disclosure stores a decryption key and encrypted confidential data in each of a plurality of devices that is mechanically separated from one another, and allows the encrypted confidential data to be decrypted through interoperation of the two devices, thereby improving the security of confidential data of the user.

On the other hand, as in another embodiment as described below, when the confidential data is used, the security server 200 may transmit a push notification message including a decryption key or encrypted confidential data to the confidential data management device 100 even though there is no particular request from the confidential data management device 100. For example, instead of receiving a request for a decryption key or confidential data from the confidential data management device 100, the security server 200 may receive a request for a push notification message from other device, and transmit a push notification message to the confidential data management device 100. That is, when it is necessary to use confidential data, the confidential data management device 100 may transmit a push notification message including the decryption key or the encrypted confidential data to the confidential data management device 100.

Referring to FIGS. 6 through 12, a method and system for performing secure authentication using the confidential data management method is described.

Figure 6:
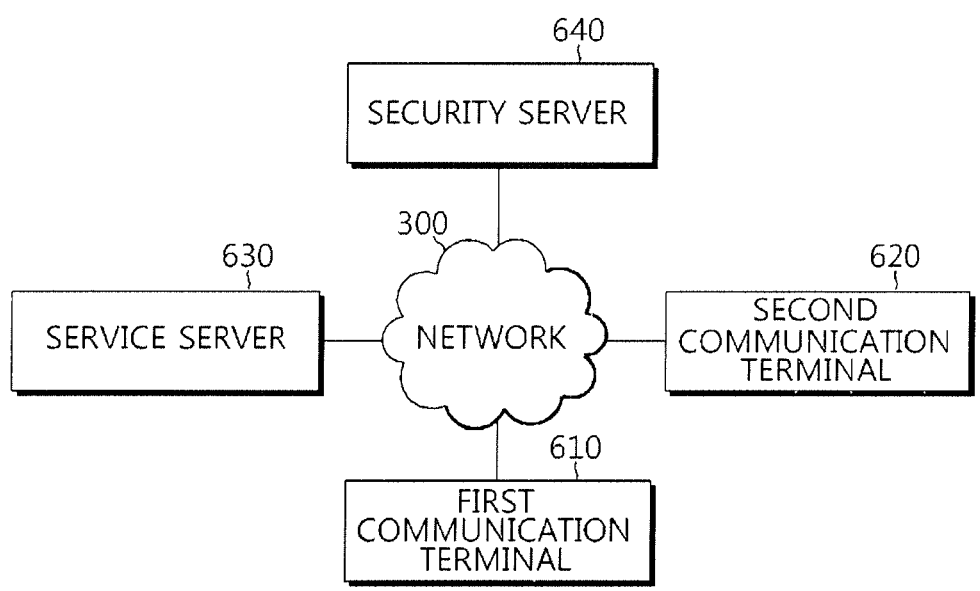
FIG. 6 is a diagram showing an architecture of a secure authentication system according to still another embodiment of the present disclosure.

FIG. 6 is a diagram shown an architecture of a secure authentication system according to still another embodiment of the present disclosure.

As shown in FIG. 6, the secure authentication system according to the present disclosure includes a first communication terminal 610, a second communication terminal 620, a service server 630, and a security server 640. Each of the servers and the terminals communicates with one another via the network 300.

The service server 630 is a server that provides a web-based service such as an online banking service, a portal Internet service and a game service, and stores user information including authentication information (e.g., a password) and user identification information (e.g., a mobile communication telephone number, an e-mail address, a login ID, etc.). Preferably, the service server 630 receives authentication information generated through a security keypad mounted on the second communication terminal 620 from a user and stores it. Particularly, when the first communication terminal 610 requests a service, the service server 630 requests the security server 640 to transmit a push notification message. In this instance, the service server 630 transmits the identification information of the user and endpoint information (e.g., a site address) of the authentication information to the security server 640. Also, the service server 630 receives authentication information of the user from the second communication terminal 620 having the received push notification message, and authenticates the user based on the authentication information.

The security server 640 performs a function of mapping endpoint information in the code table (see (b) and (c) of FIG. 7), a decryption key and user identification information, storing it, and providing a decryption key to the second communication terminal 620 based on the stored mapping data. That is, the security server 640 stores endpoint information in each code table stored in the second communication terminal 620 and a decryption key for each code table used to decrypt a corresponding code table.

Particularly, when the security server 640 receives a request for push notification from the service server 630, the security server 640 extracts a decryption key mapped to the endpoint information of the authentication information received from the service server 630 and the identification information of the user. Also, the security server 640 transmits a push notification message including the extracted decryption key to the second communication terminal 620. The security server 640 stores a receiver (i.e., an address of the second communication terminal) of the push notification message mapped to the user identification information, and transmits a push notification message to the second communication terminal 620 using the receiver of the push notification message.

The first communication terminal 610 requests a particular service to the service server 630, and receives an online service from the service server 630 based on authentication results of the authentication information transmitted from the second communication terminal 620 to the service server 630. The first communication terminal 610 may employ a desktop computer, a laptop computer, a tablet computer, a mobile communication terminal, and a smart phone.

The second communication terminal 620 is a communication device for storing confidential data of the user, and in particular, stores a plurality of encrypted code tables and has a security keypad mounted therein. Each code table is distinguished for each user and is generated for a user's exclusive use, and each terminal stores different code tables. Also, each code recorded in the code table is at least one character, number or their combined information, and is irrelevant to personal information of the user and is generated such that it is mapped to key buttons randomly.

FIG. 7 is a diagram showing a security keypad and a code table according to an embodiment of the present disclosure.

(a) of FIG. 7 shows a security keypad, and the security keypad is an input interface with a plurality of key buttons arranged. On the other hand, although 12 key buttons are shown as being arranged on the security keypad, various sizes (e.g., 5*5, 5*4, 6*6, etc.) may be applied to the present disclosure. Also, although (a) of FIG. 7 shows that key buttons indicating numbers are arranged on the security keypad, various types of key buttons such as emoticons, icons, characters and symbols may be arranged on the security keypad.

(b) and (c) of FIG. 7 illustrate a code table, and the code table records codes mapped to each key button arranged on the security keypad, namely, at least one character, number or their combined information, and each code table is classified according to the purpose of use of authentication information. For example, a first code table may be used for login authentication of a first site, a second code table may be used for electronic signature for financial transaction, and a third code table may be used for login authentication of a second site. In addition, each code table records different codes for a same key button arranged on the security keypad. Referring again to (b) and (c) of FIG. 7, the first code table ((b) of FIG. 7) records the code 's~b' mapped to the key button '1' and 'fF*' mapped to the key button '2'. On the other hand, the second code table ((c) of FIG. 7) records the code '42A' mapped to the key button '1' and 'AA9' mapped to the key button '2'.

The second communication terminal 620 generates authentication information of a user through the security keypad, and pre-registers the authentication information in the service server 630. In this instance, the second communication terminal 620 identifies an endpoint of the authentication information registered in the service server 630, and generates and stores a code table based on the endpoint. The second communication terminal 620 may generate a code table using a code table generation algorithm mounted previously, and store it. Also, the second communication terminal 620 generates an encryption key and a decryption key for the generated code table, encrypts the code table using the encryption key, and stores the decryption key in the security server 640. Preferably, the second communication terminal 620 stores the endpoint information of the generated code table, the decryption key, and the user identification information in the security server 640 together, and discards the corresponding decryption key.

Particularly, when the second communication terminal 620 receives a push notification message from the security server 640, the second communication terminal 620 identifies a decryption key and endpoint information included in the push notification message, and extracts an encrypted code table mapped to the endpoint information. Also, the second communication terminal 620 decrypts the encrypted code table using the decryption key included in the push notification message, and then identifies codes mapped to input values of the user in the decrypted code table and transmits authentication information consisting of a combination of the codes to the service server 630.

Preferably, the second communication terminal 620 has a secure authentication application mounted therein, and interoperates with the security server 640 and the service server 630 through the secure authentication application. The second communication terminal 620 is a desktop computer, a laptop computer, a tablet computer, and a mobile communication terminal, and preferably a portable smart phone.

Figure 8:
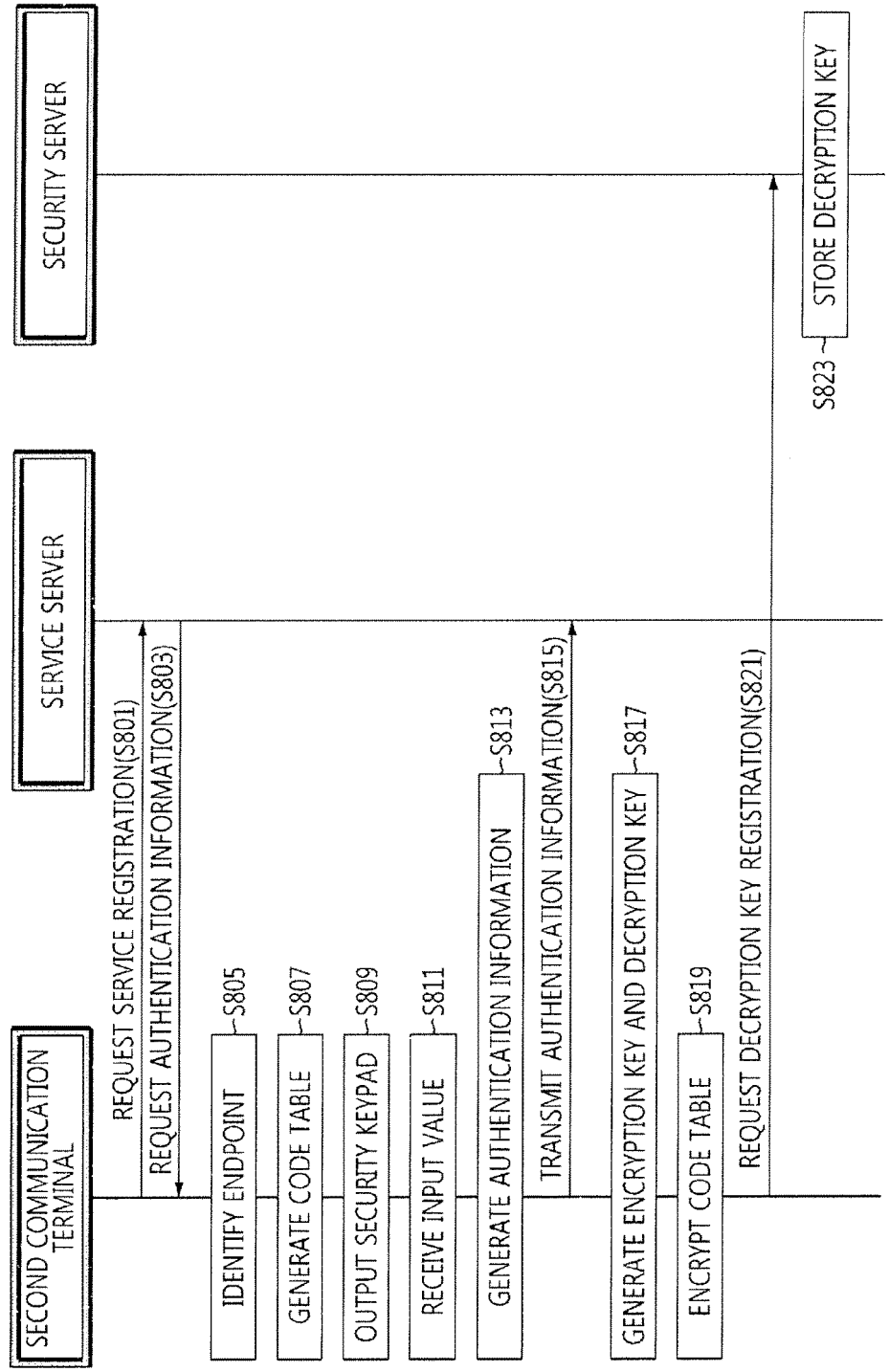
FIG. 8 is a flowchart showing a method for registering authentication information and a decryption key by a secure authentication system according to still another embodiment of the present disclosure.

FIG. 8 is a flowchart showing a method for registering authentication information and a decryption key by the secure authentication system according to still another embodiment of the present disclosure.

Referring to FIG. 8, the second communication terminal 620 requests service registration such as member enrollment to the service server 630 (S801). Subsequently, to proceed with service registration, the service server 630 requests authentication information to the second communication terminal 620 (S803).

Then, the second communication terminal 620 identifies an endpoint (e.g., a site address) of authentication information (S805), and generates a code table only for use in the endpoint using an embedded code table generation algorithm (S807). That is, the second communication terminal 620 generates a code table in which codes matched to each key button of a security keypad are recorded. On the other hand, when there is a code table having an undesignated endpoint among the pre-generated code tables, the second communication terminal 620 may select this code table as a code table for exclusive use in the endpoint.

Subsequently, the second communication terminal 620 outputs a security keypad (S809), and receives input values for a plurality key buttons from a user through the security keypad (S811).

Subsequently, the second communication terminal 620 identifies the codes matched to each key button inputted by the user in the generated code table. Subsequently, the second communication terminal 620 arranges the codes matched to each key button sequentially inputted by the user in an input order of the key buttons, and sets a character string consisting of the arranged codes as authentication information available for use in the service server 630 (S813). For example, assume the user inputted '1', '2', '3', '4' in a sequential order on the security keypad where the security keypad is as shown in (a) of FIG. 7 and the generated code table is as shown in (b) of FIG. 7. In this case, the second communication terminal 620 identifies the codes, 's~b', 'ff*' 't#A.', 'y.p', respectively matched to '1', '2', '3', '4' in the code table, and generates 's~bfF*t#Ay.p' consisting of the codes arranged in an input order, as authentication information.

Subsequently, the second communication terminal 620 transmits the generated authentication information of the user to the service server 630 (S815), and the service server 630 stores the received authentication information. Preferably, the second communication terminal 620 transmits user identification information to the service server 630, and in this case, the service server 630 stores user information including the user identification information and the authentication information.

Subsequently, the second communication terminal 620 generates a decryption key and an encryption key for exclusive use in the generated code table, encrypts the code table using the encryption key, and stores it (S817, S819). Subsequently, the second communication terminal 620 transmits a decryption key registration request message including the user identification information, the generated decryption key, and the endpoint information of the authentication information to the security server 640 (S821). Preferably, the second communication terminal 620 discards the generated encryption key and decryption key, so that the decryption key is only stored in the security server 640.

Subsequently, the security server 640 maps the user identification information, the decryption key, and the endpoint information included in the decryption key registration request message, and stores it (S823).

On the other hand, the second communication terminal 620 may request the security server 640 to generate a code table, and receive and store the code table generated by the security server 640. In this case, when the generated code table is stored in the second communication terminal 620, the security server 640 discards the code table. Also, the second communication terminal 620 may request the security server 640 to generate an encryption key and a decryption key. In this case, the security server 640 generates a decryption key and an encryption key for exclusive use in the code table, transmits the encryption key to the second communication terminal 620 to allow the code table to be encrypted through the encryption key, and stores the generated decryption key.

Figure 9:
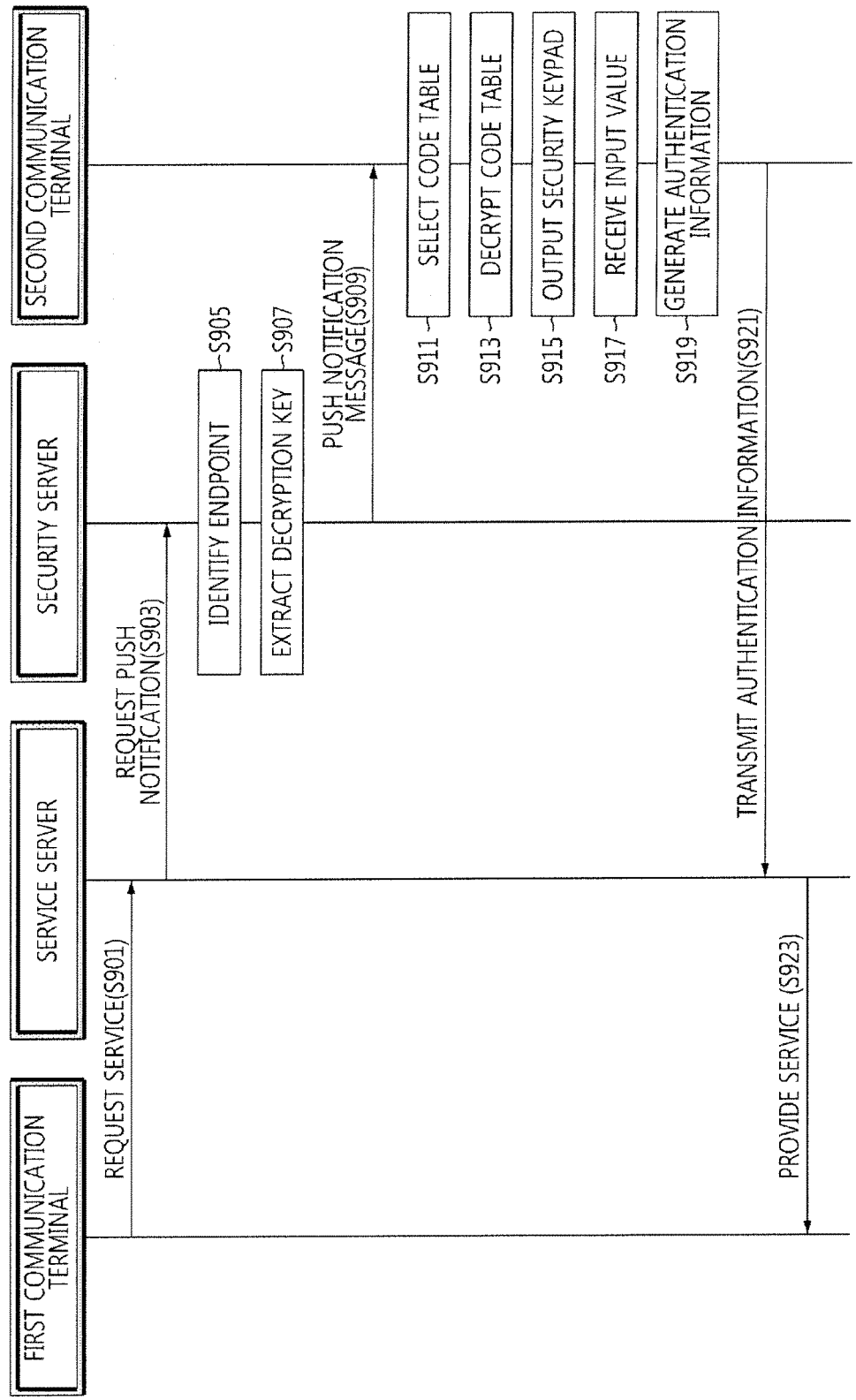
FIG. 9 is a flowchart showing a method for authenticating a user by a secure authentication system according to still another embodiment of the present disclosure.

FIG. 9 is a flowchart showing a method for authenticating a user by the secure authentication system according to still another embodiment of the present disclosure.

Referring to FIG. 9, the first communication terminal 610 requests a service requiring authentication information to the service server 630 (S901).

Subsequently, the service server 630 identifies identification information (e.g., a mobile communication telephone number, a login ID, an e-mail address, etc.) of a user and endpoint information (e.g., a site address of a service server) where authentication information is used, and transmits a push notification request message including the identification information and the endpoint information to the security server 640 (S903). In this instance, the service server 630 may request user identification information to the first communication terminal 610 and receive it, and may identify user identification information based on user information of a subscriber.

Then, the security server 640 identifies the endpoint information and the user identification information included in the push notification request message, and extracts a decryption key mapped to the endpoint information and the user identification information (S905, S907). Subsequently, the security server 640 transmits the push notification message including the endpoint information and the extracted decryption key to the second communication terminal 620 (S909). The security server 640 stores a receiver (i.e., an address of the second communication terminal) of the push notification message mapped to the user identification information, and transmits the push notification message to the second communication terminal 620 using the receiver of the push notification message.

Then, as the second communication terminal 620 receives the push notification message, the second communication terminal 620 activates a secure authentication application, and outputs a notification window notifying that authentication information was requested from a particular site (i.e., the service server) through the secure authentication application. Subsequently, the second communication terminal 620 selects an encrypted code table mapped the endpoint information included in the push notification message from a plurality of code tables (S911). Also, the second communication terminal 620 decrypts the selected encrypted code table using the decryption key included in the push notification message (S913).

Subsequently, the second communication terminal 620 outputs a security keypad to a screen (S915), and receives input values for a plurality of key buttons from the user through the security keypad (S917). Subsequently, the second communication terminal 620 identifies the codes mapped to each key button inputted by the user in the decrypted code table. Subsequently, the second communication terminal 620 arranges the codes mapped to each key button sequentially inputted by the user in an input order of the key buttons, and sets a character string consisting of the arranged codes as authentication information to generate authentication information of the user (S919). Subsequently, the second communication terminal 620 transmits the generated authentication information of the user to the service server 630 (S921).

Then, the service server 630 authenticates the user by identifying whether the authentication information received from the second communication terminal 620 matches pre-registered authentication information of the user, and when authentication succeeds, provides the service to the first communication terminal 610 (S923).

Figure 10:
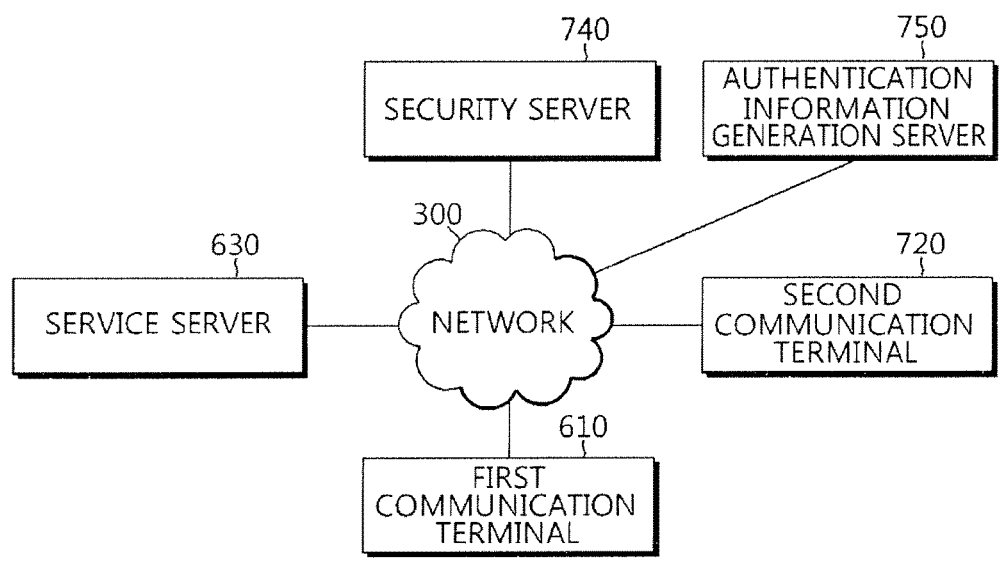
FIG. 10 is a diagram showing an architecture of a secure authentication system according to a further embodiment of the present disclosure.

FIG. 10 is a diagram showing an architecture of a secure authentication system according to a further embodiment of the present disclosure.

Among the components of FIG. 10, the components having the same reference numerals as FIG. 6 perform the same function as the description made with reference to FIG. 6, and its detailed description is omitted herein.

As shown in FIG. 10, the secure authentication system according to another embodiment of the present disclosure includes the first communication terminal 610, a second communication terminal 720, the service server 630, a security server 740, and an authentication information generation server 750.

The security server 740 performs a function of mapping endpoint information of authentication information, a decryption key and user identification information and storing it, and based on the stored mapping data, providing the decryption key to the second communication terminal 720. Particularly, the security server 740 stores the decryption key used to decrypt code table identification information in the second communication terminal 720 by code table identification information.

The second communication terminal 720 generates authentication information of a user in interoperation with the authentication information generation server 750, and pre-registers the authentication information in the service server 630. In this instance, the second communication terminal 720 identifies the endpoint information of the authentication information, and requests the authentication information generation server 750 to generate a code table for exclusive use in the endpoint. Also, the second communication terminal 720 transmits a plurality of input values received from the user through a security keypad to the authentication information generation server 750, and registers authentication information received from the authentication information generation server 750 in the service server 630. Further, the second communication terminal 720 receives identification information of the generated code table from the authentication information generation server 750, encrypts and stores the identification information of the code table, and stores a decryption key for decrypting the encrypted code table identification information in the security server 740. Preferably, the second communication terminal 720 stores the endpoint information of the authentication information, the decryption key, and the user identification information together in the security server 740.

Particularly, when the second communication terminal 720 receives a push notification message from the security server 740, the second communication terminal 720 identifies a decryption key and endpoint information included in the push notification message, and extracts encrypted code table identification information mapped to the endpoint information. Also, the second communication terminal 720 decrypts the encrypted code table identification information using the decryption key included in the push notification message, and requests the generation of authentication information by transmitting input values of the user inputted on the security keypad and the code table identification information to the authentication information generation server 750. Further, the second communication terminal 620 proceeds with authentication of the first communication terminal 610 by providing the authentication information received from the authentication information generation server 750 to the service server 630.

The authentication information generation server 750 stores a code table having respective identification information, and generates authentication information of the user based on the code table and the input values of the security keypad received from the second communication terminal 720. When the authentication information generation server 750 receives a request for generation of a code table from the second communication terminal 720, the authentication information generation server 750 generates a code table in which codes mapped to key buttons of the security keypad are recorded, and provides identification information of the code table to the second communication terminal 720. Also, when the authentication information generation server 750 receives the code table identification information and the input values from the second communication terminal 720, the authentication information generation server 750 generates authentication information of the user based on a code table having the code table identification information and the input values, and transmits it to the second communication terminal 720.

Figure 11:
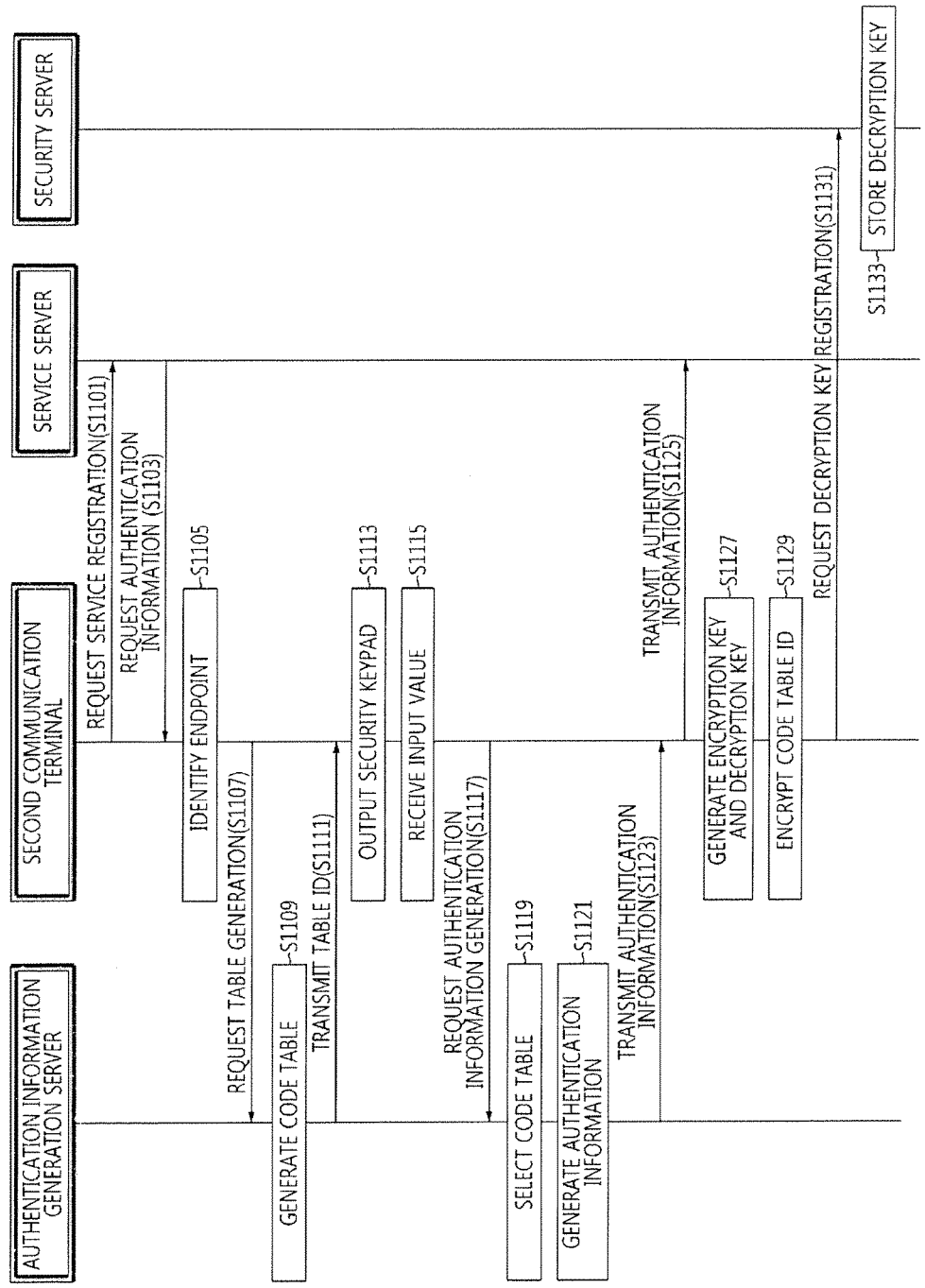
FIG. 11 is a flowchart showing a method for registering authentication information and a decryption key by a secure authentication system according to a further embodiment of the present disclosure.

FIG. 11 is a flowchart showing a method for registering authentication information and a decryption key by the secure authentication system according to a further embodiment of the present disclosure.

In the description with reference to FIG. 11, an overlapping description with FIG. 8 is provided in abridged and brief manner.

Referring to FIG. 11, the second communication terminal 720 requests the service server 630 to register a service (S1101). Subsequently, the service server 630 requests authentication information to the second communication terminal 720 (S1103).

Then, the second communication terminal 720 identifies an endpoint (e.g., a site address) of authentication information (S1105), and requests the authentication information generation server 750 to generate a code table available for use in the service server 630 (S1107).

Subsequently, the authentication information generation server 750 generates a code table for exclusive use in the endpoint using an embedded code table generation algorithm (S1109). Subsequently, the authentication information generation server 750 allocates identification information of the code table, and transmits the code table identification information to the second communication terminal 720 (S1111).

Subsequently, after the second communication terminal 720 identifies the code table identification information, the second communication terminal 720 outputs a security keypad to a screen (S1113). Also, the second communication terminal 720 receives input values for a plurality of key buttons from a user through the security keypad (S1115).

Subsequently, the second communication terminal 720 transmits an authentication information generation request message including the plurality of input values (i.e., input information on the security keypad) inputted by the user and the code table identification information to the authentication information generation server 750 (S1117).

Then, the authentication information generation server 750 identifies the code table identification information included in the authentication information generation request message, and selects a code table having the identification information from a plurality of code tables being stored (S1119). Subsequently, the authentication information generation server 750 identifies the codes mapped to each key button inputted by the user in the selected code table. Subsequently, the authentication information generation server 750 arranges the codes mapped to each key button sequentially inputted by the user in an input order of the key buttons, and sets a character string consisting of the arranged codes as authentication information to generate authentication information of the user (S1121). Subsequently, the authentication information generation server 750 transmits the generated authentication information to the second communication terminal 720 (S1123).

Then, the second communication terminal 720 transmits the received authentication information to the service server 630 (S1125), and the service server 630 stores the received authentication information. Preferably, the second communication terminal 720 transmits the user identification information to the service server 630, and in this case, the service server 630 stores user information including the user identification information and the authentication information.

Subsequently, the second communication terminal 720 generates a decryption key and an encryption key only for the code table identification information received from the authentication information generation server 750, encrypts the code table identification information using the encryption key, and stores it (S1127, S1129). Subsequently, the second communication terminal 720 transmits a decryption key registration request message including the user identification information, the generated decryption key, and the endpoint information of the authentication information to the security server 740 (S1131). Preferably, the second communication terminal 720 discards the generated encryption key and decryption key, so that the decryption key is only stored in the security server 740.

Subsequently, the security server 740 maps the user identification information, the decryption key, and the endpoint information included in the decryption key registration request message, and stores it (S1133).

On the other hand, the second communication terminal 720 may request the security server 740 to generate an encryption key and a decryption key. In this case, after the security server 740 generates a decryption key and an encryption key for exclusive use in the code table identification information, the security server 740 transmits the encryption key to the second communication terminal 720 to allow the code table identification information to be encrypted through the encryption key, and stores the generated decryption key.

Figure 12:
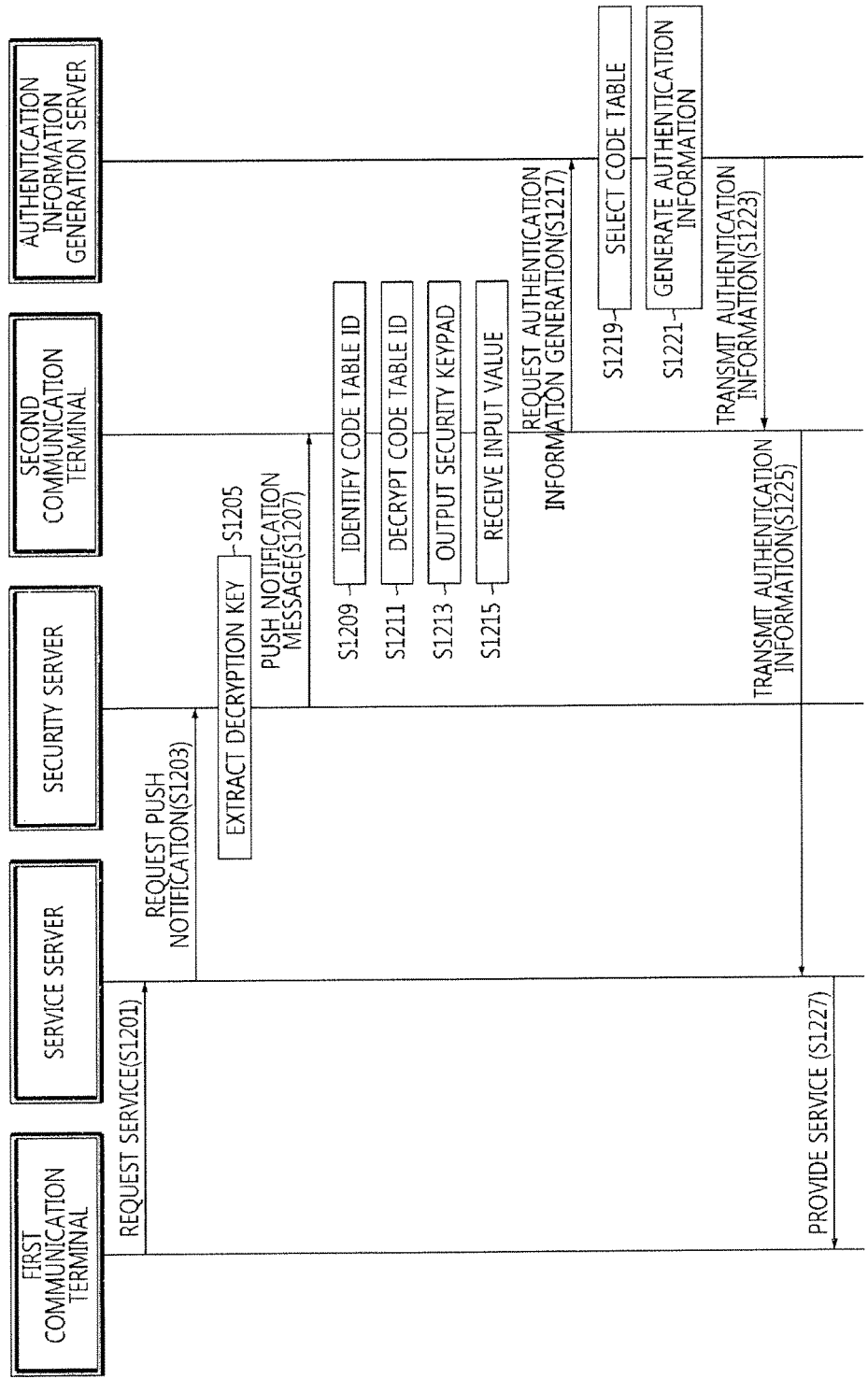
FIG. 12 is a flowchart showing a method for authenticating a user by a secure authentication system according to a further embodiment of the present disclosure.

FIG. 12 is a flowchart showing a method for authenticating a user by the secure authentication system according to a further embodiment of the present disclosure.

In the description with reference to FIG. 12, an overlapping description with FIG. 9 is provided in abridged and brief manner.

Referring to FIG. 12, the first communication terminal 610 requests a service requiring authentication information to the service server 630 (S1201). Subsequently, the service server 630 identifies identification information of a user and endpoint information where authentication information is used, and transmits a push notification request message including the identification information and the endpoint information to the security server 740 (S1203).

Then, the security server 740 identifies the endpoint information and the user identification information included in the push notification request message, and extracts a decryption key mapped to the endpoint information and the user identification information (S1205). Subsequently, the security server 740 transmits a push notification message including the endpoint information and the extracted decryption key to the second communication terminal 720 (S1207).

Subsequently, as the second communication terminal 720 receives the push notification message, the second communication terminal 720 activates a secure authentication application, and outputs a notification window notifying that authentication information was requested from a particular site through the secure authentication application. Subsequently, the second communication terminal 720 identifies encrypted code table identification information mapped to the endpoint information included in the push notification message (S1209). Also, the second communication terminal 720 decrypts the identified encrypted code table identification information using the decryption key included in the push notification message (S1211).

Subsequently, the second communication terminal 720 outputs a security keypad to a screen (S1213), and receives input values for a plurality of key buttons from the user through the security keypad (S1215). Subsequently, the second communication terminal 720 transmits an authentication information generation request message including the plurality of input values (i.e., input information on the security keypad) inputted by the user and the code table identification information to the authentication information generation server 750 (S1217).

Then, the authentication information generation server 750 identifies the code table identification information included in the authentication information generation request message, and selects a code table having the identification information from a plurality of code tables (S1219). Subsequently, the authentication information generation server 750 identifies codes mapped to each key button inputted by the user in the selected code table. Subsequently, the authentication information generation server 750 arranges the codes mapped to each key button sequentially inputted by the user in an input order of the key buttons, and sets a character string consisting of the arranged codes as authentication information to generate authentication information of the user (S1221). Subsequently, the authentication information generation server 750 transmits the generated authentication information to the second communication terminal 720 (S1223).

Then, the second communication terminal 720 requests authentication of the first communication terminal 610 by transmitting the received authentication information to the service server 630 (S1225). On the other hand, the authentication information generation server 750 may directly transmit the generated authentication information to the service server 630. In this case, the authentication information generation server 750 receives an address (i.e., a site address) of the service server 630 from the second communication terminal 720, and transmits authentication information to the service server 630 based on the address.

Subsequently, the service server 630 authenticates the user by identifying whether the received authentication information matches pre-registered authentication information of the user, and when authentication succeeds, provides the service to the first communication terminal 610 (S1227).

As described above, the secure authentication system according to the present disclosure generates authentication information having a complex character string mapped to input values of a security keypad, and makes use of the authentication information, thereby enhancing the security of authentication information. Also, the secure authentication system generates different authentication information based on an endpoint even through a user selects a same key button, thereby providing convenience to the user as well as protecting authentication information of the user more safely from external hacking such as a peeping attack. Further, the secure authentication system prevents confidential data from being normally identified using data stored in only any one of a particular device and a server, thereby protecting the user data reliably from external hacking.

While this specification contains many features, the features should not be construed as limitations on the scope of the disclosure or of the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A secure authentication method for performing secure authentication of a user by an authentication system, the secure authentication method comprising:
   receiving, by a service server, a service request from a first communication terminal;
   transmitting, by a security server, a notification message including a stored decryption key to a second communication terminal in response to a notification message transmission request received from the service server;
   decrypting, by the second communication terminal, a stored encrypted code table using the decryption key received from the security server;
   outputting, by the second communication terminal, a security keypad to a screen, and when at least one input value is received through the security keypad, identifying each code mapped to the received at least one input value in the decrypted code table;
   generating, by the second communication terminal, authentication information consisting of a combination of each identified code, and transmitting the authentication information to the service server; and
   authenticating, by the service server, the first communication terminal based on the authentication information received from the second communication terminal.

2. The secure authentication method according to claim 1, wherein the transmitting a notification message to a second communication terminal comprises identifying, by the security server, an endpoint of the authentication information, and transmitting a message including a decryption key mapped to the endpoint among a plurality of decryption keys being stored to the second communication terminal, and
   the decrypting a code table comprises decrypting, by the second communication terminal, an encrypted code table mapped to the endpoint among a plurality of encrypted code tables being stored.

3. The secure authentication method according to claim 1, before the receiving a service request, further comprising:
   generating, by the second communication terminal, a code table in which codes mapped to each key button of the security keypad are recorded, and encrypting and storing the generated code table; and
   storing, by the second communication terminal, a decryption key for decrypting the code table in the security server.

4. The secure authentication method according to claim 3, wherein the storing the code table comprises identifying an endpoint of authentication information generated using the code table and storing the encrypted code table together with the endpoint, and
   the storing in the security server comprises storing the decryption key together with the identified endpoint.

5. A secure authentication system, comprising:
   a service server which receives a request for a service from a first communication terminal;
   a security server which stores a decryption key of a code table, and transmits a notification message including the stored decryption key to a second communication terminal in response to a notification message transmission request received from the service server; and
   a second communication terminal which stores an encrypted code table, decrypts the encrypted code table using a decryption key received from the security server, identifies each code mapped to at least one input value received through a security keypad in the decrypted code table, generates authentication information consisting of a combination of each identified code, and transmits it to the service server,
   wherein the service server authenticates the first communication terminal based on the authentication information received from the second communication terminal.

6. The secure authentication system according to claim 5, wherein the security server identifies an endpoint of the authentication information, and transmits a message including a decryption key mapped to the endpoint among a plurality of decryption keys being stored to the second communication terminal, and
   the second communication terminal decrypts an encrypted code table mapped to the endpoint among a plurality of encrypted code tables being stored.

7. The secure authentication system according to claim 5, wherein the second communication terminal pre-generates a code table in which codes mapped one-to-one to each key button of the security keypad are recorded, encrypts and stores the generated code table, and pre-stores a decryption key for decrypting the code table in the security server.

8. The secure authentication system according to claim 7, wherein the second communication terminal identifies an endpoint of authentication information generated using the generated code table, stores the encrypted code table together with the endpoint, and stores the decryption key together with the identified endpoint in the security server.

9. A secure authentication method for performing secure authentication of a user by an authentication system, the secure authentication method comprising:
   receiving, by a service server, a service request from a first communication terminal;
   transmitting, by a security server, a notification message including a stored decryption key to a second communication terminal in response to a notification message transmission request received from the service server;
   decrypting, by the second communication terminal, stored encrypted code table identification information using the decryption key;
   outputting, by the second communication terminal, a security keypad to a screen, receiving at least one input value from a user through the security keypad, and transmitting the plurality of input values and the decrypted code table identification information to an authentication information generation server;
   selecting, by the authentication information generation server, a code table having the code table identification information, and identifying codes mapped to the plurality of input values in the selected code table;
   generating, by the authentication information generation server, authentication information consisting of a combination of each identified code; and
   receiving, by the service server, the generated authentication information, and authenticating the first communication terminal based on the authentication information.

10. The secure authentication method according to claim 9, wherein the transmitting a notification message to a second communication terminal comprises identifying, by the security server, an endpoint of the authentication information, and transmitting the notification message including a decryption key mapped to the endpoint among a plurality of decryption keys being stored to the second communication terminal, the decrypting code table identification information comprises decrypting, by the second communication terminal, encrypted code table identification information mapped to the endpoint among a plurality of encrypted code table identification information being stored.

11. A secure authentication system, comprising:
a service server which receives a request for a service from a first communication terminal;
a security server which stores a decryption key of code table identification information, and transmits a notification message including the stored decryption key to a second communication terminal in response to notification message transmission request received from the service server;
a second communication terminal which stores encrypted code table identification information, decrypts the encrypted code table identification information using the decryption key received from the security server, and receives at least one input value from a user through a security keypad; and
an authentication information generation server which receives the at least one input value and the decrypted code table identification information from the second communication terminal, selects a code table having the identification information, identifies a code mapped to the at least one input value in the selected code table, and generates authentication information consisting of a combination of each identified code,
wherein the service server receives authentication information generated by the authentication information generation server, and authenticates the first communication terminal based on the authentication information.

12. The secure authentication system according to claim 11, wherein the security server identifies an endpoint of the authentication information, and transmits the notification message including a decryption key mapped to the endpoint among a plurality of decryption keys being stored to the second communication terminal, and
the second communication terminal decrypts encrypted code table identification information mapped to the endpoint among a plurality of encrypted code table identification information being stored.

13. The secure authentication system according to claim 11, wherein the authentication information generation server transmits the generated authentication information to the second communication terminal, and
the service server receives the authentication information from the second communication terminal.

14. The secure authentication method according to claim 2, before the receiving a service request, further comprising:
generating, by the second communication terminal, a code table in which codes mapped to each key button of the security keypad are recorded, and encrypting and storing the generated code table; and
storing, by the second communication terminal, a decryption key for decrypting the code table in the security server.

15. The secure authentication system according to claim 6, wherein the second communication terminal pre-generates a code table in which codes mapped one-to-one to each key button of the security keypad are recorded, encrypts and stores the generated code table, and pre-stores a decryption key for decrypting the code table in the security server.

* * * * *

UNITED STATES PATENT AND TRADEMARK OFFICE
CERTIFICATE OF CORRECTION

PATENT NO. : 10,171,428 B2
APPLICATION NO. : 15/125866
DATED : January 1, 2019
INVENTOR(S) : Yang et al.

Page 1 of 1

It is certified that error appears in the above-identified patent and that said Letters Patent is hereby corrected as shown below:

In the Specification

In Column 12, Line 58, delete "'ff*'" and substitute therefor -- 'fF*' --.

Signed and Sealed this
Twenty-sixth Day of February, 2019

Andrei Iancu
*Director of the United States Patent and Trademark Office*